US006276135B1

(12) United States Patent
Ellett

(10) Patent No.: US 6,276,135 B1
(45) Date of Patent: Aug. 21, 2001

(54) SELF-CONTAINED HYDRAULIC ESD SYSTEM

(75) Inventor: James Richard Ellett, Edmonton (CA)

(73) Assignee: ARGUS Machine Co. Ltd., Edmonton (CA)

( * ) Notice: Subject to any disclaimer, the term of this patent is extended or adjusted under 35 U.S.C. 154(b) by 0 days.

(21) Appl. No.: 09/299,911

(22) Filed: Apr. 29, 1999

(51) Int. Cl.[7] ...................................................... F16D 31/02
(52) U.S. Cl. ...................................... 60/477; 91/6; 91/461
(58) Field of Search ............................ 60/477; 91/6, 461

(56) References Cited

U.S. PATENT DOCUMENTS

| | | | | |
|---|---|---|---|---|
| 3,800,537 | * | 4/1974 | Denis | 60/477 |
| 4,676,140 | * | 6/1987 | Haussler | 60/477 X |
| 4,961,560 | | 10/1990 | Ellett | 251/63.5 |
| 5,070,900 | | 12/1991 | Johnson | 137/458 |
| 5,213,133 | | 5/1993 | Ellett | 137/596.14 |
| 5,291,918 | | 3/1994 | Johnson | 137/458 |
| 5,341,837 | | 8/1994 | Johnson | 137/458 |
| 5,464,040 | | 11/1995 | Johnson | 137/556 |
| 5,522,212 | * | 6/1996 | Kubik | 60/477 X |

OTHER PUBLICATIONS

Abstract of U.S. Patent No. 4,921,207, issued May 1, 1990, Baker, 1 page.

Sigma Enterprises, Inc. product brochure entitled "Combination Hi/Low Bleeder Pilot", 1997 Technical Product Bulletin, 3 pages.

Erichsen product brochure entitled "Self Contained Hydraulic Shutdown System", at least as early as Oct. 1989, 3 pages. Inventor has seen earlier versions but does not have copies.

Bettis Actuators & Controls, product brochure entitled "PressureGuard™ Self–Contained Hydraulic Emergency Shutdown Systems", printed Sep. 1995, 6 pages.

Barber™ Industries Ltd. product brochure entitled "RA–PRESCO–DYNE Self Contained Emergency Shut Down System For Reverse Acting Gate Valves", Bulletin 680, printed Aug. 1991, and Operating Manual for Hydraulic Operated–Spring Opposed Valve Actuation Systems, printed Feb. 1993, 15 pages. Advertising for RA–PRESCO–DYNE system appeared in Oilweek magazine, Canada, in Sep. 1977.

Barber™ Industries Ltd. C–HL–Presco Pilot 1991+10+28, and Type C–HL–Presco Pilot, Model 5398, 14+Nov.+1991, 2 pages.

Barber™ Industries Ltd. product brochure entitled "Presco–Pilot", 10/91, 4 pages.

"New pressure control pilot solves a pollution problem," Jim Ellett, Oilweek, Canada, Sep. 20, 1971.

* cited by examiner

*Primary Examiner*—Hoang Nguyen
(74) *Attorney, Agent, or Firm*—Anthony R. Lambert

(57) ABSTRACT

A hydraulic control circuit for a hydraulic actuator, including a high-low pilot valve having a sensing port for connection to a flow line. A single pressure line connects the high-low pilot to a hydraulic actuator. A second line connects the high-low pilot to a reservoir. A normally closed relief valve is connected to the single pressure line for relief of excessive pressure. A normally closed override valve is connected to the single pressure line for manual override of circuit controls. A pump is connected to the single pressure line for pressuring the single pressure line. The hydraulic control circuit has a normally open time out valve on the single pressure line, the time out valve being set to close a pre-set time interval after being manually activated, to isolate the high-low pilot, from the single pressure line to the hydraulic actuator, until the time out period has elapsed. The override valve is connected to the single pressure line between the time out valve and the hydraulic actuator. The relief valve is connected to the single pressure line between the time out valve and the hydraulic actuator. The override valve, relief valve, high-low pilot, and the pump are connected between the first line and the reservoir.

5 Claims, 5 Drawing Sheets

SELF-CONTAINED HYDRAULIC ESD SYSTEM

FIELD OF THE INVENTION

This invention relates to hydraulic emergency shut-down systems (ESD) for actuating closure of valves.

BACKGROUND OF THE INVENTION

Several emergency shut down systems are known in the art such as the ESD sold by Erichsen, the ESD sold by Bettis of Houston, USA, the RA-Presco™-Dyne ESD sold by Barber Industries, of Edmonton, Canada, and U.S. Pat. No. 5,341,837 of Johnson. U.S. Pat. No. 4,961,560 Ellett-Two Way Latching Trip Valve. U.S. Pat. No. 5,070, 00 Johnson-Safety Valve Actuator. U.S. Pat. No. 5,213,133 Ellett-Pilot Control Valve. U.S. Pat. No. 5,291,918 Johnson-Safety Valve Actuator. U.S. Pat. No. 5,464,040 Johnson-Safety Valve Actuator. These devices typically include a pilot valve that senes pressure in a flow line. When the pressure moves out of a pre-defined range, the pilot valve signals an actuator to close a valve and shut down flow in the flow line. These devices typically have a high pressure line and a low pressure line. The high pressure line is used to actuate the actuator, while the low pressure line is controlled by the pilot valve.

SUMMARY OF THE INVENTION

The use of dual high and low pressure controls unnecessarily complicates the design of the ESD. This invention provides a novel ESD that includes a single pressure line for control functions at the pilot valve and actuator.

There is therefore provided in accordance with an aspect of the invention, a hydraulic control circuit for a hydraulic actuator, including a high-low pilot valve having a sensing port for connection to a flow line. A single pressure line connects the high-low pilot to a hydraulic actuator. A second line connects the high-low pilot to a reservoir. A normally closed relief valve is connected to the single pressure line for relief of excessive pressure. A normally closed override valve is connected to the single pressure line for manual override of circuit controls. And a pump is connected to the single pressure line for pressuring the single pressure line.

In a further aspect of the invention, the hydraulic control circuit has a normally open time out valve on the single pressure line, the time out valve being set to close a pre-set time interval after being manually activated. In a further aspect of the invention, the override valve is connected to the single pressure line between the time out valve and the hydraulic actuator. The relief valve is preferably connected to the single pressure line between the time out valve and the hydraulic actuator. The override valve, relief valve and the pump are preferably connected between the first line and the reservoir.

In addition, this invention provides a novel configuration of pilot valve and time out valve.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which.

DETAILED DESCRIPTION OF PREFERRED EMBODIMENTS

In this patent document, a reference to "a connection", "connected" or "connect(s)" is a reference to hydraulic connection unless the context otherwise requires.

Figure 1:
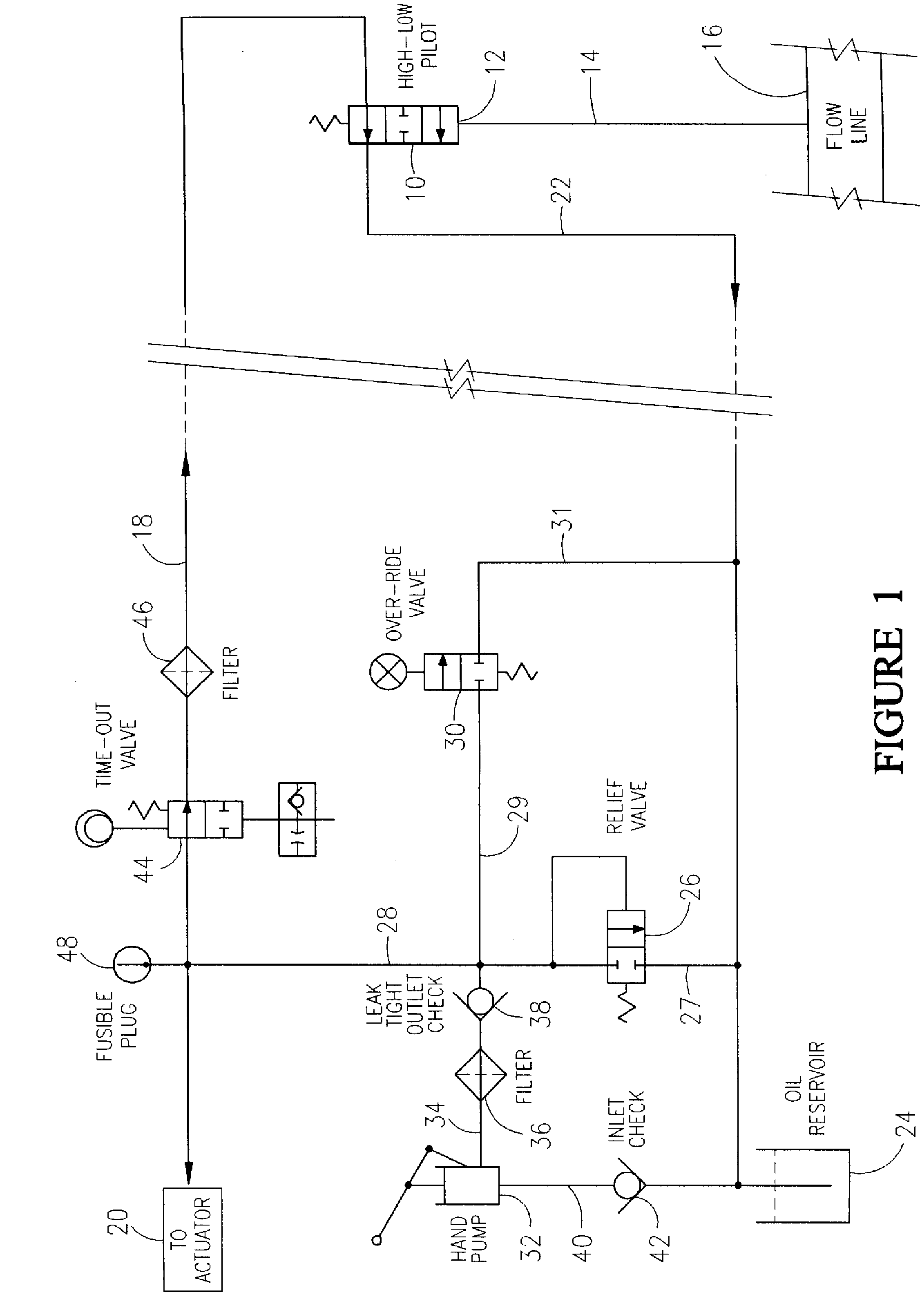
FIG. 1 is a hydraulic schematic of a hydraulic control circuit according to the invention.

Referring to FIG. 1, there is shown a hydraulic control circuit for an actuator 20, which actuates a valve, not shown. A high-low pilot valve 10 is connected to a flow line 16 to be monitored through port 12 of valve 10 and line 14. A single pressure line or hydraulic manifold 18 connects the high-low pilot 10 to the hydraulic actuator 20. The single pressure line 18 has a single pressure along its length, and thus forms a single pressure circuit. A second line 22 connects the high-low pilot 10 to a reservoir 24. A normally closed relief valve 26 is connected to the single pressure line 18 through line 28 for relief of excessive pressure and drains through line 27 and line 22 to the reservoir 24. A normally closed override valve 30 is connected to the single pressure line through line 28 and 29 for manual override of circuit controls. The line 28 connects to the line 18 between the time out valve 44 and actuator 20. The override valve 30 drains through line 31 and 22 to the reservoir 24. A pump 32 is connected to the single pressure line 18 via line 34 and line 28 for pressuring the single pressure line. The pump 32 is preferably a hand pump, and is separated from the line 28 by a filter 36 and a leak tight outlet check valve 38, both on line 34. The pump 32 is also connected via line 40 with inlet check valve 42 to reservoir 24.

When the pump 32 is activated, fluid moves from reservoir 24 through lines 40, 34 and 28 into line 18. The relief valve 26 and override valve 30 block return of fluid to reservoir 24, and thus pressure builds up in line 18 when the pump 32 is activated. The time out valve 44 is normally open, and is set to close a pre-set time interval after being manually activated. The time out valve 44 is described in more detail in relation to FIGS. 6–10. A filter 46 is also provided on the single pressure line 18, along with a fusible plug 48.

The hydraulic control circuit works as follows. The high-low pilot 10 monitors pressure in the flow line 16 and is normally closed. When the pressure exceeds a high set point or is lower than a low set point, the pilot valve 10 opens, and hydraulic fluid drains from line 18 and 22 into reservoir 24.

Loss of pressure at the actuator 20 causes the actuator 20 to close its associated valve. If the pressure in lines 28 or 18 becomes too high itself, then relief valve 26 opens, until the pressure returns to normal. The actuator 20 can be activated manually by operation of the override valve 30. If the temperature becomes too high, fusible plug 48 opens to allow line 18 to drain and activate the actuator 20.

To set the actuator 20 initially, pressure must be built in line 18. This is accomplished initially by closing time out valve 44. High low pilot 10 is open with low line pressure being sensed. The time out valve 44 begins to count down towards opening. How it does this is described in relation to FIGS. 6–10. While time out valve 44 is closed, pump 32 is activated to increase the pressure in lines 18 and 28 until actuator 20 is activated. Activation of actuator 20 will lead to increase of pressure in flow line 16, and if the line is working properly, pressure in line 16 will be in its intended operating range. Thus, when valve 44 opens, the high-low pilot 10 will have closed, thus maintaining pressure in line 18 and activating the actuator 20 with pressure in line 18.

The pilot 10 is shown in FIGS. 7–10. The pilot 10 is designed to bleed down an E.S.D. hydraulic circuit when high or low pressures are sensed, such as in an Oil/Gas production or pipeline facility. The high and low set points are independently adjustable to meet predetermined levels, in accordance with the desire of the operations personnel. The pilot may be used for high only or low only or both high and low in one unit. Several springs can be chosen to provide a broad range of set points, in both high and low categories.

The time out valve 44 is shown in FIGS. 2–6. The time-out valve 44 is located in the pilot circuit shown in FIG. 1 so that when start up is required and the pilot is in the bleed down position (low line pressure being sensed), the time-out valve can be closed preventing bleed down of hydraulic pressure enabling the E.S.D. system to be pressured up with hydraulic oil.

Figure 2:
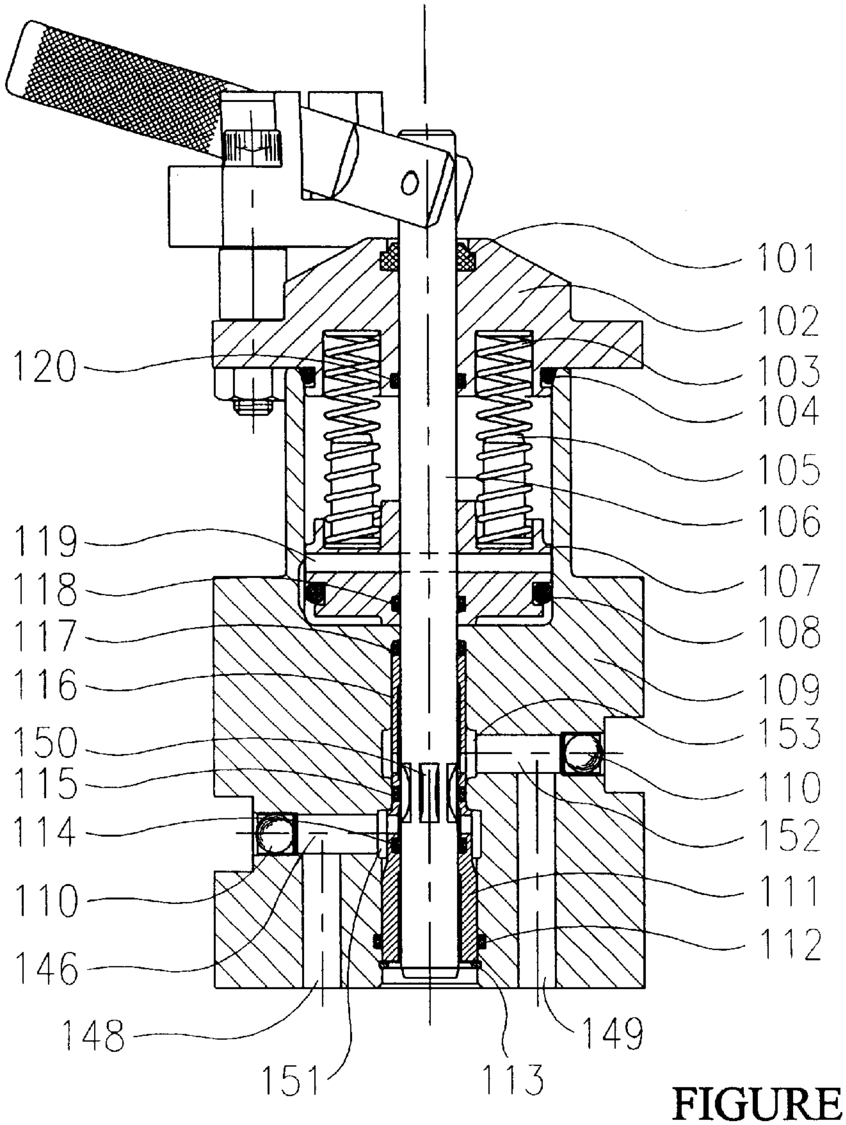
FIG. 2 is a section through a time out valve for use in the hydraulic circuit of FIG. 1.
Figure 3:
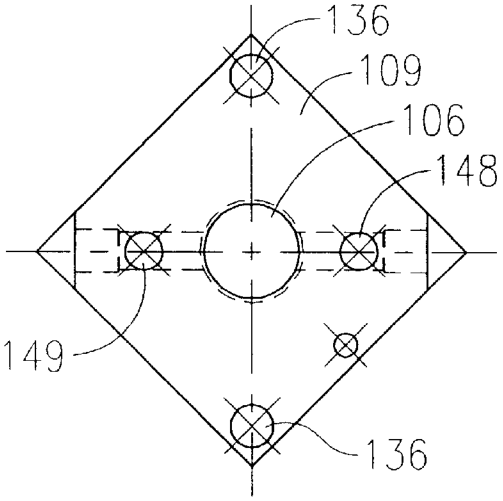
FIG. 3 is a bottom view of the time out valve of FIG. 2.

Referring to FIG. 2, the time-out valve 44 is formed from a body 109, with head 102. An O-ring 104 is provided between body 109 and head 102. A stem 106 extends through the body 109 and head 102, and is provided with a stem wiper 101 to keep the stem 109 clean. A piston 107 sits in a cylindrical chamber between the body 109 and head 102. The stem 106 passes through the piston 107. Springs 103 are positioned between the head 102 and piston 107 on spring guides 105 O-rings 108, 120 and 118 are provided respectively between the piston 107 and body 109, between stem 106 and head 102 and between piston 107 and stem 106. Within the body 109, the stem 106 sits in inner cage 116 and outer cage 111. Lower O-ring 112 and upper O-ring 114 are provided between outer cage 111 and the body 109. Outer cage 111 is secured in the body 109 by snap ring 113. The stem 106 is provided with grooves 150. An O-ring 115 is provided in the body 109 adjacent the grooves 150 in the stem 106. An O-ring 117 is provided at the upper end of the inner cage 116 between the stem 106 and body 109. A pin 119 is provided transversely in the piston 107 to hold the piston 107 on the stem 106. The body 109 is provided with ports 149 and 148. The port 148 communicates with a bore 146 which terminates in an annular groove 151 in the body 109 that extends around the stem 109 at the top of the outer cage 111. Bore 146 is plugged on its outer end with plug 110. The port 149 communicates with a bore 152 which terminates in an annular groove 153 in the body 109 that extends around the stem 109 at the bottom of the inner cage 116. Bore 152 is plugged on its outer end with plug 110.

Figure 6:
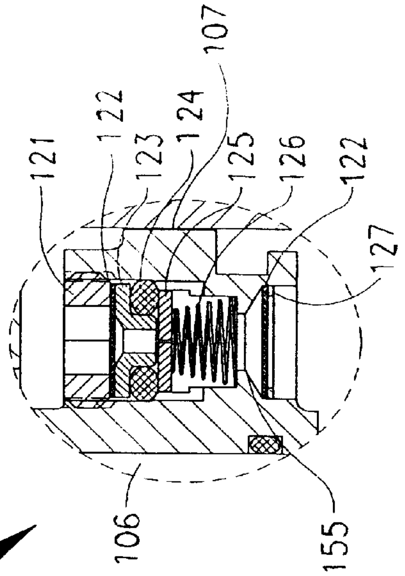
FIG. 6 is a detail of a drip valve for use in the time out valve of FIG. 2.
Figure 5:
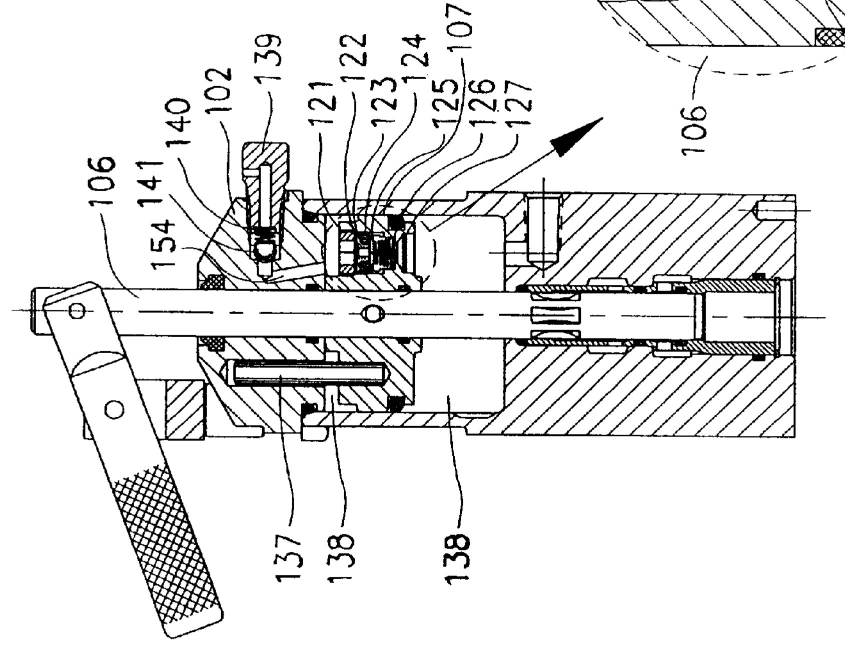
FIG. 5 is a section through the time out valve of FIG. 2 with the section taken at right angles to the section of FIG. 2.
Figure 4:
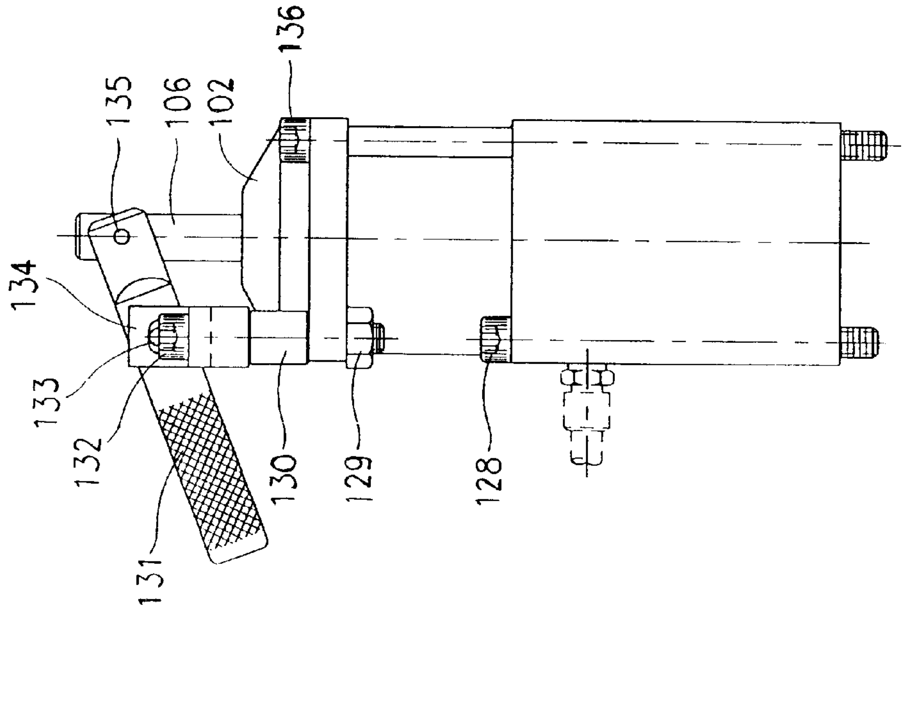
FIG. 4 is a side view of the time out valve of FIG. 2.
Figure 8:
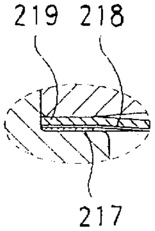
FIG. 8 is a detail of a diaphragm used in the pilot valve of FIG. 7.
Figure 7:
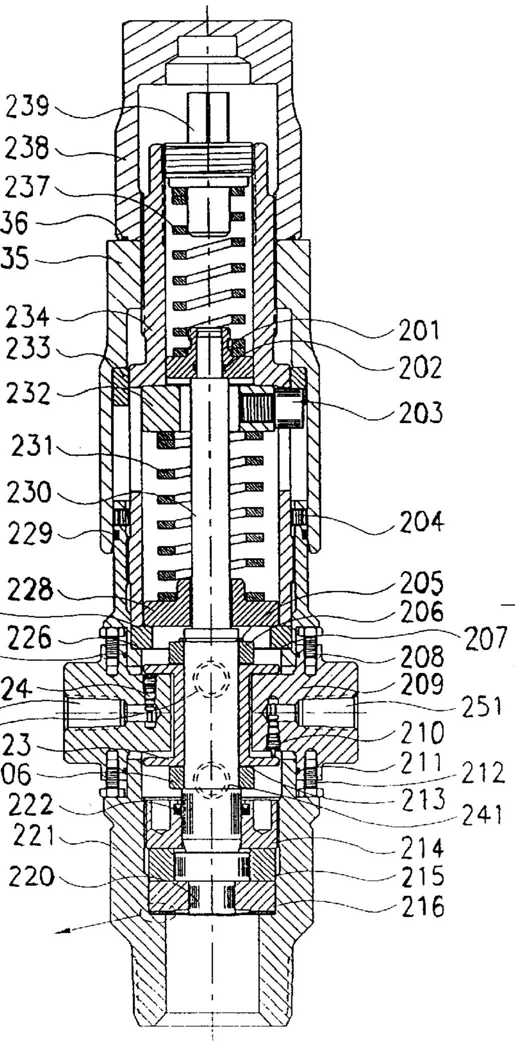
FIG. 7 is a section through a pilot valve for use in the hydraulic control circuit of FIG. 1.
Figure 9:
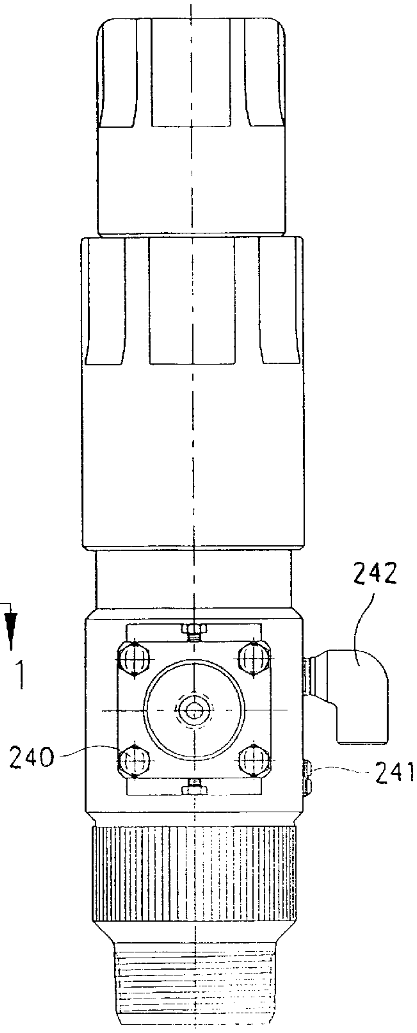
FIG. 9 is a is side view of the pilot valve of FIG. 7.

Referring to FIGS. 4–6, the stem 106 is provided with handle or lever 131 which is pivotally attached to stem 106 at pivot pin 135. The lever 131 is pivotally secured to the head 102 by lever bracket 134 and fulcrum pin 133 which passes through both the lever bracket 134 and the lever 131. A capscrew 132 with nut 129 secures the lever bracket 134 to the head 102, with the bracket 134 spaced from the head 109 by spacer 130. Capscrews 136 secure the head 102 to the body 109. Capscrews 128 secure the body 109 to a supporting block (not shown). An alignment pin 137 aligns the piston 107 with respect to the head 102. The chamber 138 above and below the piston 107 is filled with dampening fluid. A vent plug 139, with spring 140 and ball 141, is provided at the top of the chamber 138 in head 102, and communicates with the chamber 138 through bore 154. The ball 141 is biased against the terminus of bore 154 in head 102 by spring 140.

Referring in particular to FIG. 6, the piston 107 has a metering valve connecting between the portions of the chamber 138 above and below the piston 107. The metering valve is formed from a retainer 121, under which is placed a screen 122 and insert 123. The insert 123, which is hat shaped, forms a seat for an O-ring 124. An orifice disc 125, with an orifice in the middle, is placed against the insert 123 and 0ring 124. A spring 126 is placed between a shoulder 155 on the piston 107 and the orifice disc 125. A snap ring 127 keeps a second screen 122 in place.

When the time-out valve 44 is open, oil can flow up through port 149 in body 109 through inner cage 116, through grooves 150 in stem 106, and through the outer cage 111 into port 148 in body 109 to the line 118.

To close the time-out valve, the lever 131 is pushed down. This raises the stem 106 so that the grooves 150 do not connect with the inner cage 116 and outer cage 111 and the hydraulic oil cannot go through the time-out valve 44.

When the time-out valve 44 is closed with the lever 131 pushed down (stem up), the pilot 10 is timed out of the circuit for as long as it takes for the time-out valve 44 to open again on its own.

The time-out valve 44 operation is described as follows: When the stem 106 is moved up by the lever 131, the piston 107 moves up with the stem 106 and compresses piston springs 103. As the piston 107 moves up in the upper bore of the body 109, the dampening fluid 138 lifts orifice disc 125 off O-ring 124 around the insert 123, thus allowing fluid to pass so the piston 107 can, in fact, move up. Upon releasing the lever 131, the piston springs 103 push down on the piston 107. The dampening fluid 138 now has to flow through the seated orifice disc 125 which delays the rate that the piston 107 and stem 106 moves downward. This delay causes the pilot 10 to be timed-out of the circuit. The duration of time-out can be determined by choosing the orifice size in the orifice disc 125 and by choosing a suitable viscosity for the dampening fluid 138.

The pilot is designed particularly for use with the E.S.D. shown in FIG. 1, but it may be used with other systems requiring high and low set points. When the production/pipeline facility pressure is too high or too low due to failure of the facility, the pilot senses this condition and bleeds down E.S.D. system hydraulic pressure causing the shut down valve (not shown) to close and prevent product loss. The pilot is shown in FIGS. 7–10.

The base of the pilot consists of a bottom sub 221, which contains a pressuresensing capsule, which is made up of nut 214, upper ring 215, lower ring 216, gasket 217, diaphragm 218, scrolled support disc 219, and piston 220. The design and operation of the pressure sensing system is described in greater detail in U.S. Pat. No. 5,670,766 of Argus Machine Co. Ltd., of Edmonton, Canada, from whom the product may be purchased. The nut 214 is used to hold down the upper ring 215, and the lower ring 216, which compresses the gasket 217, sealing off the sensed facility pressure against the diaphragm 218. The scrolled support disc 219 transmits the diaphragm 218 movement to the piston 220. This design differs slightly from what is described in U.S. Pat. No. 5,670,766 by having an increased piston stroke which is required to sufficiently open a high poppet 210 and low poppet 224, to provide adequate bleed down rate of the hydraulic pressure.

Stem 230 transfers movement of the piston 220 through low base plate 201 to low pressure spring 237 and at higher pressures through high base plate 228 to high pressure spring 231. Spool 223 is positioned approximately in an axial relationship to the stem 230 by the use of a selection of two spool spacers 206, one above and one below the spool 223, and necessary shims 207 and 213, all retained snugly with a snap ring 205. The assembly in this paragraph may be modified to use threads on the stem 230 and in the spool 223 with a lock nut instead of the snap ring 205.

A top sub 234 is threaded into the bottom sub 221 and holds stop ring 227 down against stop ring shims 226. The number of stop ring shims 226 is determined by how many it takes to cause the stem 230 to shoulder up against the high base plate 228 when the upward travel of the stem 230 has reached 50% of its total travel. This portion of the travel is called the low pressure travel function, and may be approximately 0.025". Two set screws 204 are inserted through threaded holes in the bottom sub 221 into counterbored holes in the top sub 234 locking them together.

The high pressure spring 231 is situated between the stop ring 227 and the high adjuster ring 232. The high pressure spring 231 is compressed by screwing down high adjustment knob 235 against high contact ring 233 which moves down against the high load screws 203 moving them down with the high adjuster ring 232. High pressure spring 231 controls the high pressure travel function, namely the top 50% of the upward stem 230 travel.

The low pressure spring 237 is situated between the low base plate 201 and low adjustment 239. Low pressure spring 237 is compressed by screwing down the low adjustment 239. The low pressure spring 237 controls the low pressure travel function.

Low adjustment cover 238 serves to totally enclose the inner pilot assembly, as well as the low adjustment 239, and threads onto the top sub 234. O-rings 211 (between bottom sub 221 and a lower side of poppet block 209), 225 (between an upper side of poppet block 209 and bottom sub 221), 229 (between high adjustment knob 235 and bottom sub 221), and 236 (between cover 238 and knob 235) seal off the outer atmosphere from the inner pilot assembly. O-ring 202 only serves to hold the low base plate 201 from falling out of place off the stem 230. An elastomeric U-cup seal 222 keeps impurities and condensed water vapor out of the lower portions of the pilot assembly.

The operating position of the high poppet 210 is adjusted by activating upper setting screws 208 and lower setting screws 212, which thread into the poppet block 209, before tightening block capscrews 240. The same procedure is used to obtain the operating position of the low poppet 224. Currently a body breather vent 242 is used to return the E.S.D. hydraulic oil, bled down by either the high poppet 210 or the low poppet 224. Optionally, the poppet blocks 209 may be configured to port the fluid bled by the poppets 210 and 224 directly to a return line. A body drain plug 241 is provided for draining the pilot body. Pressure in from line 18 is provided to high sense side of the pilot 12 through port 251, and to low sense side of the pilot 12 through port 250. Activation of the poppet valves 210 and 224 cause fluid to flow through the ports 251 and 250 respectively around the spool 223 between the spool 223 and the poppet block 209 and exit the pilot 12 through outlet drain 242, which connects to line 22. The poppet valves 210 and 224 are of the type typically used as tire stem valves.

Figure 10:
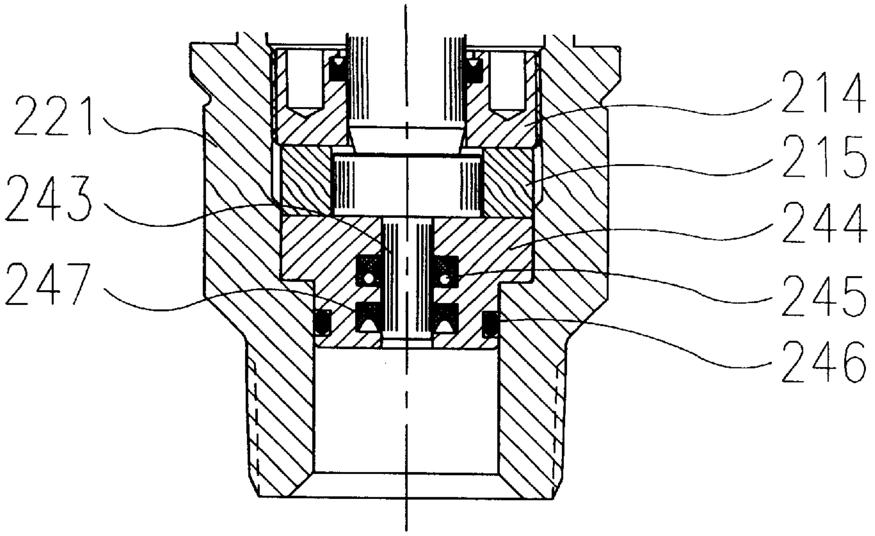
FIG. 10 is a section through a pilot valve similar to the one shown in FIG. 7 but showing a modification used for high pressure lines.
Figure 11:
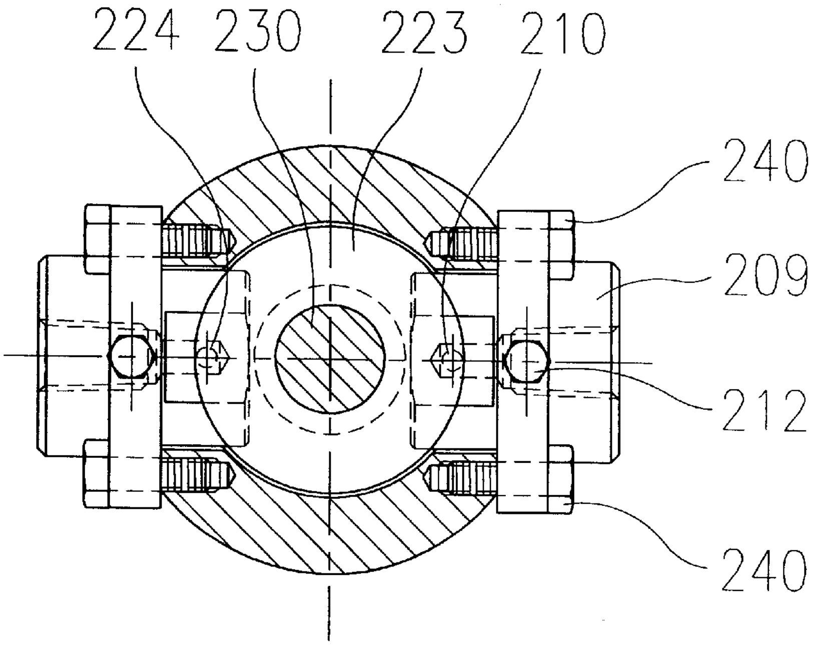
FIG. 11 is a section along the line 11—11 of FIG. 7.

The high and low set points are adjusted separately, the high set point being affected by subsequent low set point changes. Adjustments of the high set point do not affect the low set point. It is therefore desirable to complete the low set point adjustments before completing the high set point adjustment. For high pressure Oil/Gas production or pipeline applications, an alternate plunger type piston 243 received by collar 244 and packed with packing seals 245 and 246 can be used instead of the diaphragm 218, as shown in FIG. 10.

In an embodiment of the ESD made by Argus Machine Co. Ltd. of Edmonton, Alberta, Canada, the oil reservoir 24 had a useable volume of 140 cu. in. (200 cu. in. to fill). The maximum sustained output pressure was 2,000 p.s.i. Automatic transmission fluid was used as the hydraulic fluid in line 18 down to −20° F. and aircraft hydraulic oil for below −20° F. (J-13 Univis). The general operational instructions are: To start-up system (opening gate valve with actuator 20), lift knob on time-out valve 44 (to isolate pilot signal). Reciprocate handle of hand pump 32 until valve is open. After the time-out period has elapsed, the high-low pilot 10 takes over control of the system. When either high or low set points are sensed by the high-low pilot 10, the hydraulic oil pressure is bled back to tank 24 causing the acuator 20 to close the gate valve. If it is desired to close the gate valve even though sensed flow line pressures are within the set points of the pilot, simply depress the knob on the over-ride valve 30. A fusible plug 48 is incorporated into the system to automatically bleed the hydraulic oil pressure back to tank in the event of a fire or extremely high temperature.

To test the high-low pilot 10, use an isolation valve between it and the flow line 16.

Use a pressure gauge and a hand operated hydraulic hand pump to simulate flow line pressures and test for both high and low set points.

1. Mount the subject E.S.D. System onto the spring close actuator cylinder 20 with bracket and clamps (available from Argus Machine Co. Ltd.), and mount the pressure control pilot 10 on its own test stand adjacent to the E.S.D.
2. Connect the actuator 20, hydraulic manifold 18 and pressure control pilot 10, using stainless steel tubing and fittings. Use Loctite PST dope on pipe threads where applicable.
3. Remove filler cap (pressure/vacuum type) and ¾ fill the hydraulic oil reservoir with J-13 Univis aircraft hydraulic oil. Leave the filler cap off until air bleeding is done.
4. Install a temporary pressure gauge (2,000 p.s.i.) on the port, where the fire safe fusible plug 48 is normally installed, for this test. (The system relief valve is set at 1,000 p.s.i.)
5. The pressure control pilot 10 should be sensing zero pressure at this time to allow the air to be displaced from within the system.
6. Activate the lever of the time-out valve 44 & reciprocate the hand pump 32 until the spring close actuator 20 has fully opened the gate valve.

7. Wait for the time-out valve 44 to shift and bleed the pressure from the actuator 20.
8. Allow five (5) minutes for the air bubbles to escape from the oil in the reservoir 24.
9. Apply pressure to the pressure control pilot 10, bringing it into the operating range between the high and low set points.
10. Pump up the system again, opening the gate valve.
11. Push down on the knob of the over-ride valve 30 and hold it down until the gate valve closes.
12. Allow five (5) minutes for the air bubbles to escape from the oil in the reservoir 24.
13. Repeat Steps 6, 11 and 12. Install the filler cap.
14. Repeat Step 6 and check the low set point of the pressure control pilot 10.
15. Repeat Step 6 and check the high set point of the pressure control pilot 10.
16. Apply pressure to one side of the gate valve and check its operation, by either cycling the pressure control pilot 10 or, by setting the pilot 10 within the operating range and using the over-ride valve 30.
17. Check the leak tight integrity of the system by installing a dial indicator (reading in 0.001" increments) on the stem of the spring close actuator 20 when the gate valve is in the open position.
18. The stem of the dial indicator should rest on the head of the spring close actuator. Spring close actuator action, from the valve open position, should clear the dial indicator after about 0.500" of movement.
19. The dial indicator dwell position, for the leak tight integrity test, should be about 0.100" to 0.400" from the fully open gate valve position. Jog the over-ride valve to obtain this position. 'Zero' the dial and let the system stand for one hour. The actuator stem should not shift more than 0.001" during that time. The system temperature should be held within ±5° F. during this test.
20. To speed up the process of determining the cause of leak down, if any, temporarily install an instrument valve in the supply line from the hydraulic manifold 18 to the pilot 10. (In an emergency a ¼" N.P.T. pipe plug could be installed at the manifold instead.)

A person skilled in the art could make immaterial modifications to the invention described in this patent document without departing from the essence of the invention that is intended to be covered by the scope of the claims that follow.

The embodiments of the invention in which an exclusive property or privilege is claimed are defined as follows:

1. A hydraulic control circuit for a hydraulic actuator, the hydraulic control circuit comprising:

a high-low pilot valve having a sensing port for connection to a flow line;

a first line connecting the high-low pilot to a hydraulic actuator, the first line forming a single pressure circuit;

a second line connecting the high-low pilot to a reservoir;

a normally closed relief valve connected to the first line for relief of excessive pressure;

a normally closed override valve connected to the first line for manual override of circuit controls; and a pump connected to the first line for pressuring the first line.

2. The hydraulic control circuit of claim 1 further comprising a normally open time out valve on the first line, the time out valve being set to close for a pre-set time interval after being activated.

3. The hydraulic control circuit of claim 1 in which the override valve is connected to the first line between the time out valve and the hydraulic actuator.

4. The hydraulic control circuit of claim 1 in which the relief valve is connected to the first line between the time out valve and the hydraulic actuator.

5. The hydraulic control circuit of claim 1 in which the override valve, relief valve and the pump are connected between the first line and the reservoir.

* * * * *